United States Patent
Röhm

[11] Patent Number: 5,375,858
[45] Date of Patent: Dec. 27, 1994

[54] LOCKABLE SELF-TIGHTENING HAMMER-DRILL CHUCK

[76] Inventor: Günter H. Röhm, Heinrich-Röhm-Strasse 50, 89567 Sontheim, Germany

[21] Appl. No.: 153,442

[22] Filed: Nov. 16, 1993

[30] Foreign Application Priority Data

Nov. 16, 1992 [DE] Germany ............... 4238464

[51] Int. Cl.⁵ ........................................... B23B 31/12
[52] U.S. Cl. ..................................... 279/63; 279/140; 279/902
[58] Field of Search ..................... 279/60–65, 279/140, 902

[56] References Cited

U.S. PATENT DOCUMENTS

| | | | |
|---|---|---|---|
| 4,836,563 | 6/1989 | Rohm | 279/63 |
| 4,955,623 | 9/1990 | Rohm | 279/60 |
| 5,054,796 | 10/1991 | Rohm | 279/60 |
| 5,171,030 | 12/1992 | Rohm | 279/62 |
| 5,236,206 | 8/1993 | Rohm | 279/63 |

FOREIGN PATENT DOCUMENTS

| | | | |
|---|---|---|---|
| 3424679 | 2/1986 | Germany | 279/60 |
| 3432918 | 11/1989 | Germany | |
| 3903443 | 6/1990 | Germany | |

*Primary Examiner*—Steven C. Bishop
*Attorney, Agent, or Firm*—Herbert Dubno; Andrew Wilford

[57] ABSTRACT

A self-tightening hammer-drill chuck has a chuck body centered on and rotatable about an axis, a guide rotatable about the axis on the body, and a plurality of jaws radially displaceable on the guide and engaged with a screwthread of the body so that rotation of the guide in a forward tightening direction on the body moves the jaws radially together and opposite rotation moves them apart. A ring formed with an annular row of teeth is axially nondisplaceable on the bodies and angularly spaced abutment formations fixed on the guide are engageable with the ring. A tightening spring urges the ring angularly in the forward direction on the guide. A holding sleeve axially displaceable on the body has an annular row of teeth meshable in a locking position with the teeth of the ring. A return spring urges the holding sleeve axially into the locking position. Front and back abutments operatively effective on the body and holding sleeve permit only limited angular movement of the holding sleeve on the body and define relative to the forward tightening direction front and back end positions of the holding sleeve on the body. A cam surface operatively engageable with the holding sleeve axially displaces the holding sleeve into the freeing position when engaged with either of the front and back abutments and for displacement of the holding sleeve into the locking position when between the front and back abutments.

10 Claims, 5 Drawing Sheets

LOCKABLE SELF-TIGHTENING HAMMER-DRILL CHUCK

FIELD OF THE INVENTION

The present invention relates to a drill chuck. More particularly this invention concerns a self-tightening chuck for a hammer drill.

BACKGROUND OF THE INVENTION

A drill chuck such as described in U.S. Pat. No. 4,836,563 for use with a tool having a shaft typically has a chuck body centered on and rotatable about an axis and an adjustment body centered on the axis, rotatable about the axis on the chuck body, and axially fixed on the chuck body. One of the bodies is formed with a plurality of angularly equispaced jaw-guide passages centered on respective jaw axes all lying on the surface of an imaginary cone centered on the axis. The other of the bodies is formed with a screwthread centered on the axis and exposed in the guide passages. Respective jaws displaceable in the passages along the respective axes are each formed with a row of teeth meshing with the screwthread so that relative rotation of the bodies in one direction moves the jaws radially inward and axially forward and opposite relative rotation moves the jaws radially outward and axially rearward.

Such a chuck is often set up to be self-tightening and is also provided with a locking or holding ring that is axially and limitedly angularly displaceable on the chuck body and engageable with teeth on the adjustment body to limit its rotation. A spring is braced between the locking ring and the chuck body so that, if the jaws loosen, the spring will advance them.

In order that the locking ring not interfere with the self-tightening action, it is necessary that the locking ring be limitedly rotatable on the chuck to follow the rotation of the element that rotates as the chuck self tightens. Two-end stops are provided as described in U.S. Pat. No. 4,773,657 and a spring arrangement that normally returns the locking ring to the so-called starting end position corresponding to the position from which it will move as the chuck self tightens. To this end the locking ring is formed with two axially extending short and long grooves and the chuck body has a head that projects into them. In one end position the head is in the long groove so that teeth on the front end of the locking ring engage the adjustment sleeve and prevent it from rotating and in the other position the head is in the short groove and the locking-ring and adjustment-sleeve teeth do not engage. The locking ring can be pulled back against the force of a spring to allow the position to be selected.

In my earlier German patents 3,432,918 and 3,903,443 I describe another such system where the self-tightening movement is limited in order to prevent the jaws from biting too deeply into the tool. These end positions can be defined by a pin engaging radially from the holding sleeve into an angularly elongated slot of the drill spindle on which the chuck body is mounted. Alternately two teeth on the holding ring that coact with planar faces of the chuck body can be used.

Such arrangements are workable, but require that the user operate them very carefully. They must be manipulated carefully, with specific axial and rotary movements in a specific sequence, in order to ensure that the chuck is locked and in self-tightening mode when released. If the holding ring is not, for instance, twisted against the tightening direction before it is released, the tightening spring is not loaded and there will be no subsequent self-tightening action.

OBJECTS OF THE INVENTION

It is therefore an object of the present invention to provide an improved self-tightening hammer-drill chuck.

Another object is the provision of such an improved self-tightening hammer-drill chuck which overcomes the above-given disadvantages, that is which automatically resets itself when operated, even by a careless user.

SUMMARY OF THE INVENTION

A self-tightening hammer-drill chuck has according to the invention a chuck body adapted to be mounted on a drill spindle and centered on and rotatable about an axis, a guide body rotatable about the axis on the chuck body but axially fixed on the chuck body, a screwthread formed on one of the bodies, and a plurality of jaws radially displaceable on the other of the bodies and engaged with the screwthread so that rotation of the guide body in a forward tightening direction on the chuck body moves the jaws radially together and opposite rotation moves them apart. A ring formed with an annular row of teeth is axially nondisplaceable on the bodies and angularly spaced abutment formations fixed on the guide body are engageable with the ring for permitting only limited rotation of the ring on the guide body. A tightening spring braced angularly between the ring and the guide body urges the ring angularly in the forward direction on the guide body. A holding sleeve axially displaceable on the chuck body has an annular row of teeth meshable in a locking position with the teeth of the ring. The teeth of both rows are complementary and sawtooth shaped with steep and shallow flanks. The steep flank of each locking-ring tooth is ahead in the tightening direction of the respective shallow flank. A return spring is braced between the holding sleeve and the chuck body and urges the holding sleeve axially into the locking position. The holding sleeve is movable against the return spring into a freeing position with the rows of teeth out of mesh with each other. Front and back abutments operatively effective on the chuck body and holding sleeve permit only limited angular movement of the holding sleeve on the chuck body and define relative to the forward tightening direction front and back end positions of the holding sleeve on the chuck body. A cam surface operatively engageable with the holding sleeve axially displaces the holding sleeve into the freeing position when engaged with either of the front and back abutments and for displacement of the holding sleeve into the locking position when between the front and back abutments.

With the system of this invention it is merely necessary to relatively twist the holding sleeve and guide in the appropriate directions to set the various parts in the right positions. When the chuck is tightened, the tightening spring is automatically loaded. Tightening is not impeded by the elements responsible for self-tightening action. The sawteeth allow the chuck to be opened easily and ensure that the locking ring is automatically set in the freeing position when the chuck is loosened.

According to the invention the guide body is formed with a plurality of angularly equispaced pockets open toward the chuck body and each having a pair of end faces. The guide body in fact includes a locking ring formed with the pockets. Furthermore the ring is formed with respective projections engaged in the pockets and having front and back end faces respectively engageable with the respective front and back end faces and spaced angularly apart by a distance substantially shorter than an angular spacing between the respective pocket front and back abutments. One such tightening spring is provided in each pocket braced between the respective back end faces. The use of several such projections means the system can transmit considerable torque and withstand rough treatment.

The chuck body of this invention has a follower tab engaging the cam surface and the cam surface is formed on the holding sleeve. The cam surface forms an intermediate abutment, a back ramp extending therefrom toward the respective back abutment, a level portion extending from the intermediate abutment toward the front abutment and positioned such that, when in operative engagement with the tab, the holding sleeve is in the freeing position. A front ramp extends from the level portion to the front abutment. In fact according to the invention the intermediate abutment defines a shoulder having an axial height shorter than an axial depth of the teeth so that, when the tab is against the intermediate abutment and its teeth slip over the guide-body teeth, the holding sleeve is moved past the intermediate abutment. The front ramp is so steep and the return spring so soft that when substantially only the return spring is urging the holding sleeve into the locking position it will move into the locking position by sliding along the ramp. The holding sleeve includes a ring fixed to it and formed with the tab.

In accordance with a further feature of the invention a flat abutment face is formed on the chuck body, and a tooth having a pair of opposite flanks extends at an obtuse angle to each other on the holding sleeve. The flanks are alternately engageable with the flat abutment face in angular end positions of the holding sleeve on the chuck body.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
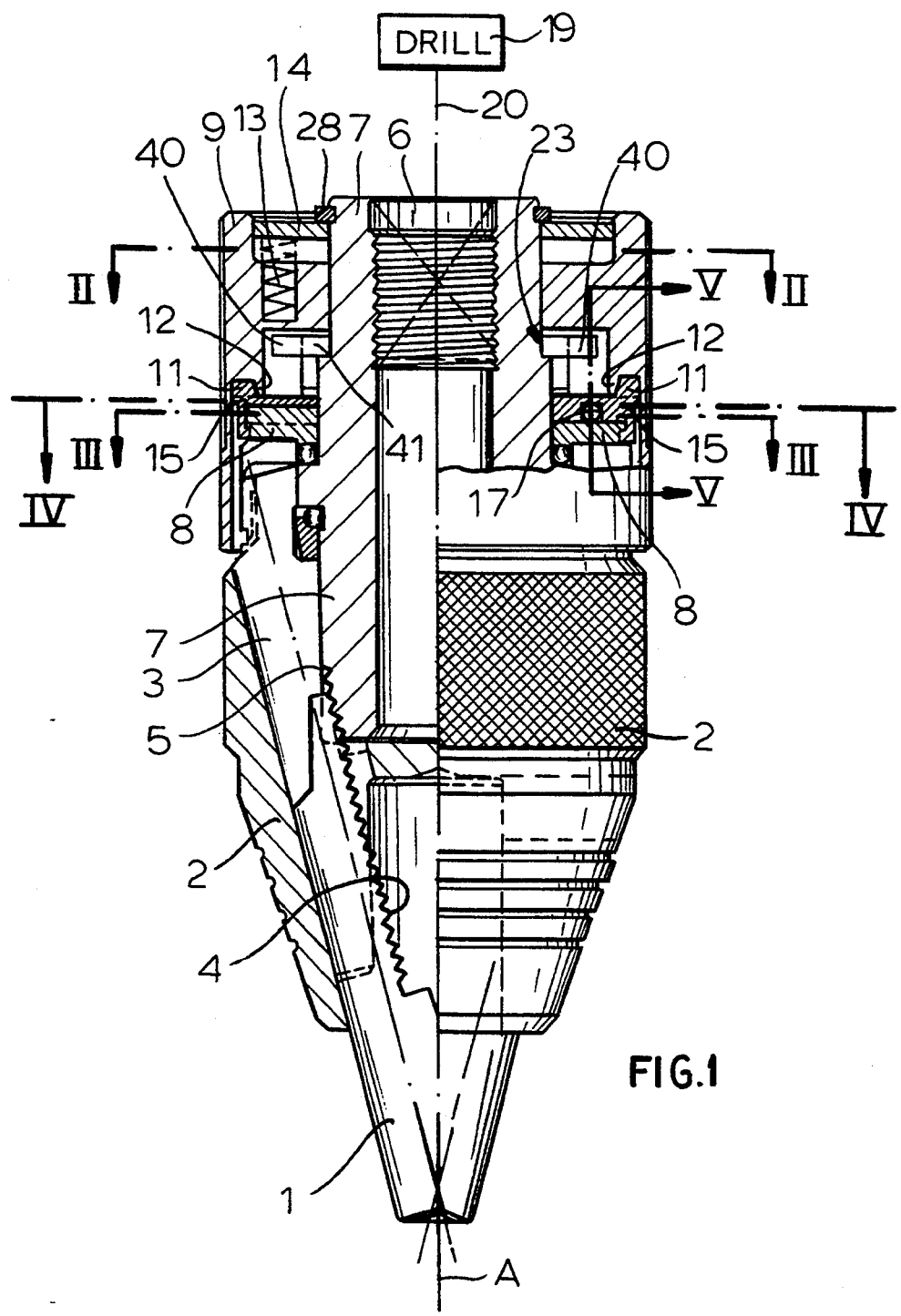
FIG. 1 is a side view partly in axial section through the chuck of this invention.

As seen in FIGS. 1 through 4 a drill chuck according to this invention is centered on an axis A and has a outer body guide 2 formed with three angled passages 3 each slidably receiving a respective jaw 1. This outer guide 2 is rotatable but axially fixed on a chuck inner body 7 that is formed with a frustoconically forwardly tapered screwthread 5 meshing with rows of teeth 4 formed on the inside edges of the jaws 1. This body 7 is formed with a rearwardly open threaded hole 6 that is normally mounted on the threaded spindle 20 of a power drill 19. Alternately the guides 3 could be formed in the body 7 and the screwthread 5 on the guide 2. Either way, relative rotation of the two parts 2 and 7 about each other in one direction will move the jaws 1 axially forward (down in FIG. 1) and radially inward to close or tighten the chuck, and opposite relative rotation will move them oppositely to open or loosen the chuck.

A lower locking-ring part 8 is fixed axially and rotationally on the outer guide 2 and a coupling ring or upper locking-ring part 15 sits atop it and is limitedly angularly displaceable on it as will be described below. This ring part 15 is formed on its outer edge with axially backwardly directed teeth 11 that mesh with axially forwardly directed teeth 12 formed on a holding sleeve 9 that is axially displaceable on the body 7 but only limitedly angularly displaceable thereon. Six axially extending compression springs 13 have front ends braced against the holding sleeve 9 and rear ends against a washer 14 that is axially fixed by a snap ring 28 on the body 7.

FIGS. 5a through 5d show how each of the teeth 11 is sawtooth-shaped and has, relative to a forward chuck-tightening direction 18, a perpendicular or steep front flank 21 and an angled or shallow rear flank 22. The direction 18 is the direction the integral guide 2 and ring 8 rotate in relative to the body 7 during tightening of the chuck. The sawteeth 11 and 12 are angled such that on rotation of the ring 8 opposite to the tightening direction 18 the teeth 11 and 12 will cam apart and disengage, but on forward rotation in direction 18 the teeth 11 and 12 will block and not slip.

Figure 2:
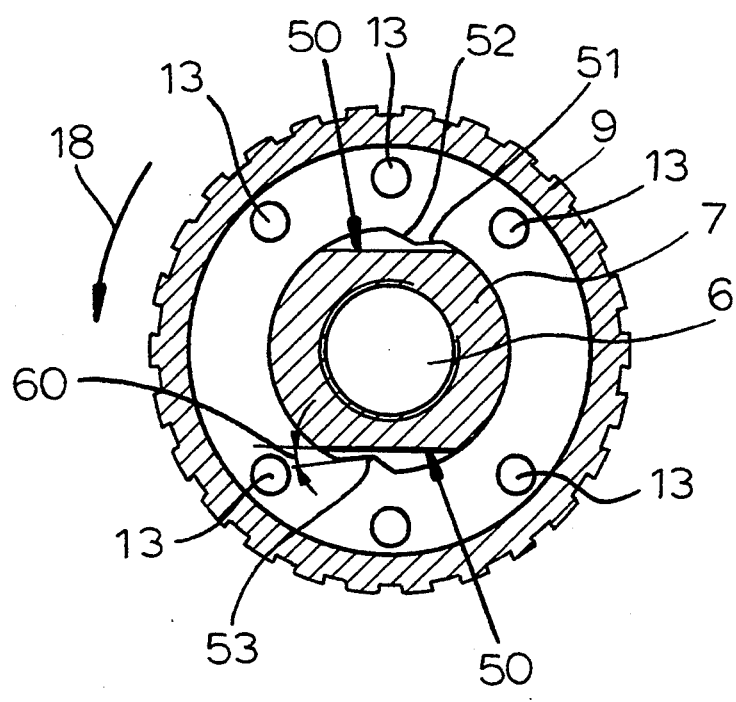

As seen in FIG. 2 the chuck inner body 7 is formed with two parallel, outwardly facing, and diametrically opposite flat abutment faces 50 that are each axially level with a respective radially inwardly projecting tooth 53 formed on the sleeve 9. These teeth 53 each have a pair of flat flanks 51 and 52 that extend at an obtuse angle to each other and that are flatly engageable with the respective face 50. Thus the sleeve 9 is limitedly axially rotatable on the chuck inner body 7.

Figure 4:
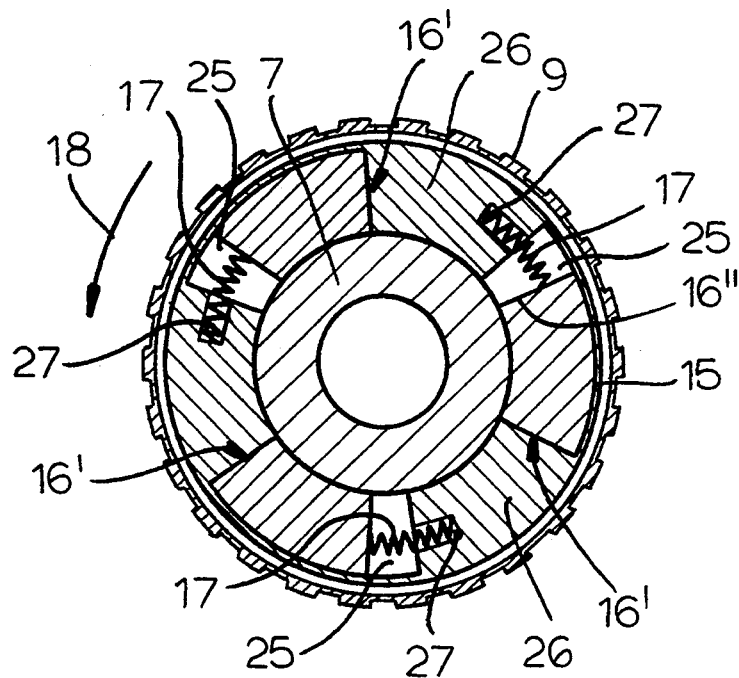
FIGS. 2, 3, and 4 are sections taken respectively along lines II—II, III—III, and IV—IV of FIG. 1.

As shown in FIG. 4 the ring part 15 is formed with three inwardly projecting blocks or parts 26 that engage in respective radially outwardly open pockets 25 formed in the ring part 8. The pockets 25 have front and rear end faces 16' and 16" that are spaced apart by a distance substantially greater than the angular distance between the opposite angular end faces of the parts 26 so that these parts 26 can move angularly limitedly in the pockets 25. A spring 17 is seated in a recess 27 in the rear end of each guide 26 and bears angularly against the rear face 16" of the respective pocket 25 to urge the ring part 15 angularly in the direction 18 that is the direction the guide 2 must be rotated in to tighten the chuck.

Thus at its simplest in the forward position illustrated in FIG. 1 of this holding sleeve 9 the teeth 11 and 12 mesh to rotationally couple the guide 2, which is fixed to the part 8, with the body 7, ignoring the limited relative angular movement possible between the ring parts 15 and 8 and between the sleeve 9 and body 7. This is the locked position. In an unlocked position the sleeve 9 is drawn axially backward (up in FIG. 1) to disengage the teeth 11 and 12 from each other and allow the parts 2 and 7 to rotate freely relative to each other. This is the unlocked or freeing position.

Figure 3:
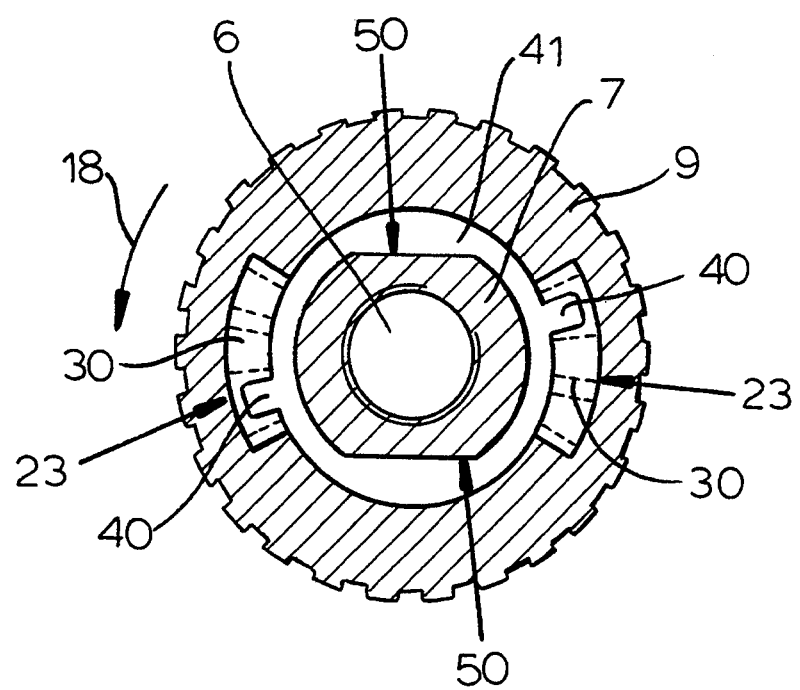

As seen in FIG. 3 a washer 41 fixed rotationally on the inner body 7 has a pair of follower tabs or projections 40 that extend into radially inwardly open cam pockets 23 formed in the holding sleeve 9. FIGS. 5a through 5d show how each cam pocket 23 forms a pair of end abutments 10.1 and 10.3 that determine the relative end position of the sleeve 9 relative to the ring part 15 and an intermediate position 10.2 related to the self-tightening function of the chuck as described below. (In fact the travel limits defined by the abutments 10.1 and 10.3 correspond generally to those defined by the surfaces 50, 51, and 52). These follower tabs 40 can move along a cam surface 30 of the pockets which is divided into regions 31, 32, 33, and 34. The region 31 is relatively high, that is to say is spaced axially relatively far back and has a length 24 equal to the adjustment stroke of the device so that when the cam follower 40 rests against it the teeth 11 and 23 are in mesh. The region 32 is angled, running from the surface 31 axially forward to the one end abutment 10.1 and, when the follower 40 moves along it, can cam the sleeve 9 out of engagement with the teeth 12 of the ring part 15. The portion 35 is angled and starts at the intermediate abutment 10.2 and runs past a low point 33 to the region 34 which is formed as a seat. While engaging any of the regions 33, 34, or 35 the teeth 11 and 12 are also out of mesh with each other.

The chuck described above works as follows:

To start with a drill bit is inserted between the jaws 1, the sleeve 9 is pulled if necessary back to disengage the teeth 11 and 12 from each other, and the chuck guide 2 is rotated in the tightening direction 18 until the jaws 1 seat on the drill bit. Then the sleeve 9 is released to mesh the teeth 11 and 12 together and the parts are in the position of FIG. 5a.

Further rotation of the chuck guide 2 and its ring 8 in the forward direction 18 relative to the chuck body 7 will therefore rotationally entrain the chuck body 7 and its abutment tabs 40 in this direction 18. This rotation relative to the stationary sleeve 9 is possible because the ring 8 is against the front abutment 16' and the spring 17 is fully extended, so there is room for each tab 26 to travel through a distance 70 in the respective pocket 25. This rotation of the body 7 in the sleeve 9 in direction 18 causes the tabs 40 to ride up on the cam ramp 32 to the end position 10.1 in which the teeth 11 and 12 are out of engagement with one another, moving the structure to the position of FIG. 5c. In this position not only does each abutment tab 40 engage the respective end abutment 10.1, but each face 50 of the body 7 engages the respective face 51. In FIG. 2 angle 60 therefore represents the angular movement from the position of FIG. 5a to that of FIG. 5c. In this position the jaws 1 are tightened on the tool only by rotation of the ring 8 in the direction 18. When the ring 8 and sleeve 9 are released in this position the springs 13 push the sleeve 9 axial back forward, causing the tabs 40 to ride back up the ramps 32 and the teeth 11 and 12 to mesh, returning to the FIG. 5a position.

When in this position during boring the reverse torque applied to the bit and through the jaws 1 to the chuck guide 2 causes the guide 2 and ring 8 to rotate in the direction 18. The ring 15 is urged in the same direction by the springs 17, so that rather than loosening, the chuck stays tight. Once the maximum adjustment stroke 24 has been traversed, however, the tabs 40 will come to rest against the abutments 10.2. The guide 2 and ring 8 can rotate further with compression of the return springs 17 until the rear end of each tab 26 engages the respective rear abutment 16" at which time further self-tightening action is impossible. This is the position of FIG. 5b.

Figure 5A:
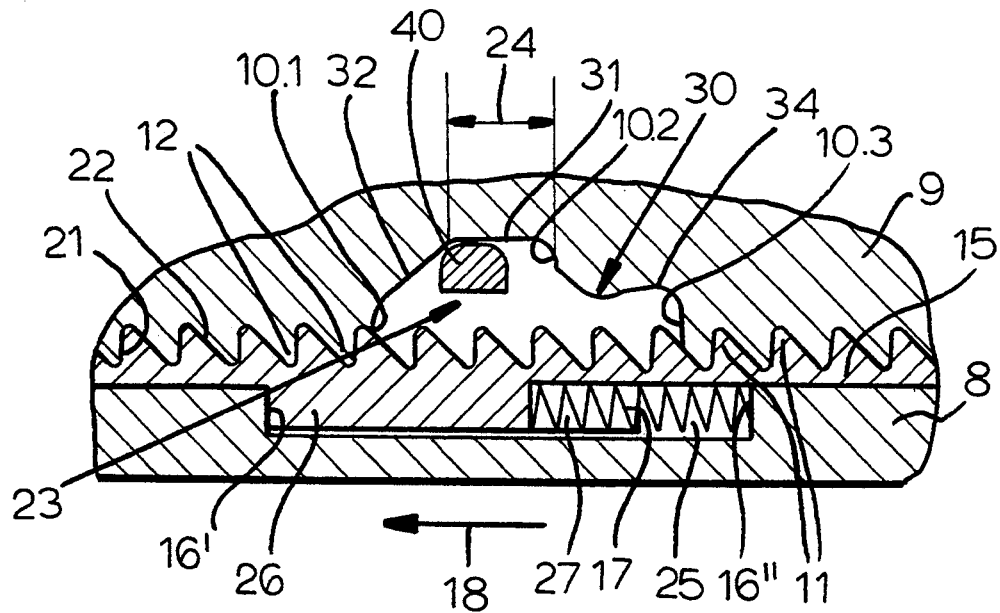
FIGS. 5a, 5b, 5c, and 5d are large-scale sectional views corresponding to line V—V of FIG. 1 and showing the parts of the chuck in different operational positions.
Figure 5B:
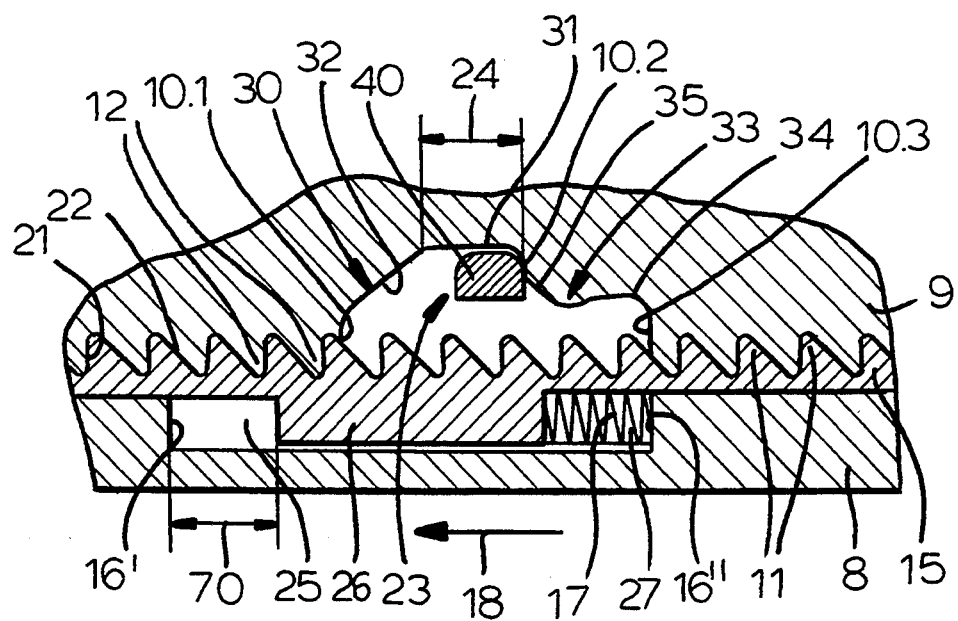
Figure 5C:
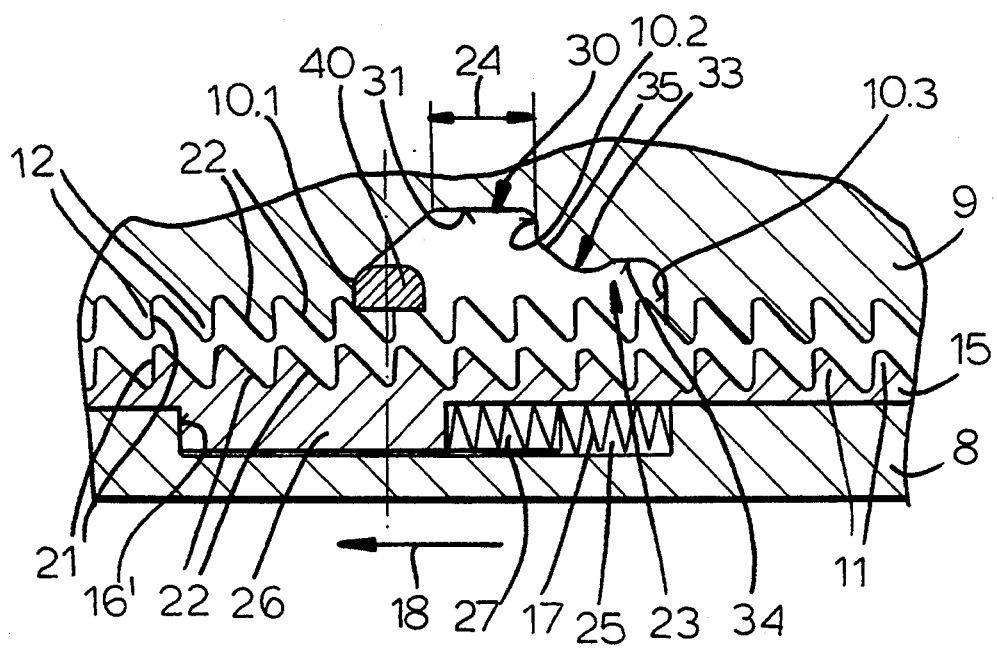
Figure 5D:
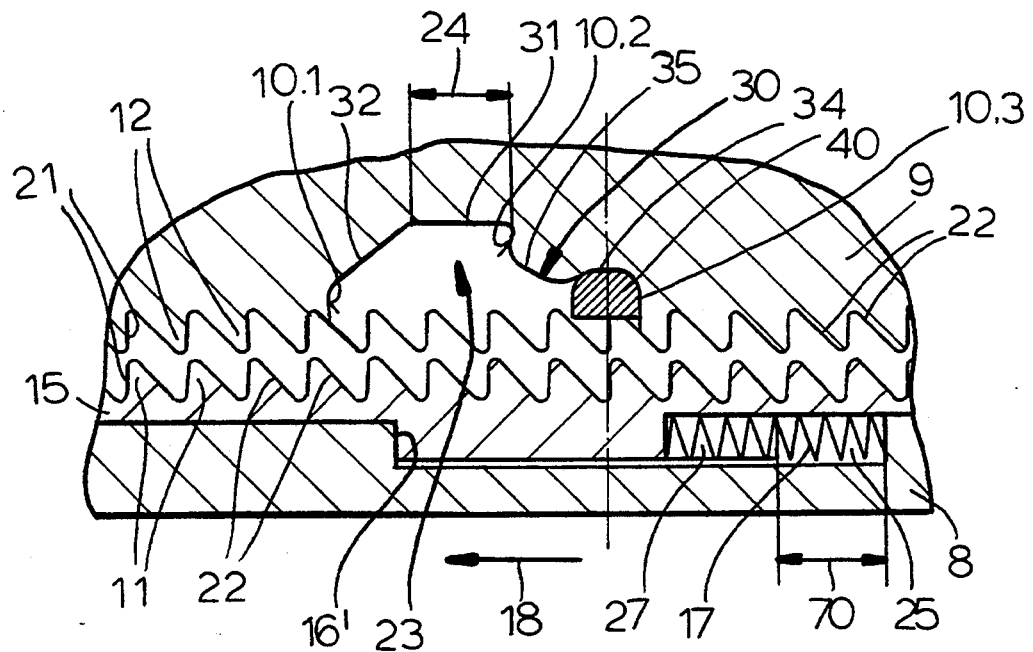

To loosen the chuck from this position, the guide 2 and ring 8 are rotated opposite to the direction 18 relative to the immobilized sleeve 9 until the abutment tabs 26 engage the front abutment ends 16' of the ring 8. Subsequent rotation entrains the toothed ring 15 opposite to the direction 18 so that its angled flanks 22 will cam up the sleeve 9, causing the tabs 40 to ride up on the intermediate abutment 10.2 and then over the ramps 35 to lodge in the seats 34, thereby retaining the sleeve 9 in the rear freeing position as shown in FIG. 5d. Once in this position the chuck guide 2 can be rotated in either direction and the tabs 40 will only be pulled out of the seats 34 when the jaws 1 seat on a tool. Thus when a tool is engaged by the jaws 1 and the guide 2 and ring 8 are rotated in the tightening direction 18, at first the tabs 40 will be pulled out of the seats 34, moving the parts back into the FIG. 5a position.

I claim:

1. A self-tightening hammer-drill chuck comprising:
    a chuck body adapted to be mounted on a drill spindle and centered on and rotatable about an axis;
    a guide body rotatable about the axis on the chuck body but axially fixed on the chuck body;
    a screwthread formed on one of the bodies;
    a plurality of jaws radially displaceable on the other of the bodies and engaged with the screwthread, whereby rotation of the guide body in a forward tightening direction on the chuck body moves the jaws radially together and opposite rotation moves them apart;
    a ring formed with an annular row of teeth and axially nondisplaceable on the bodies;
    means including angularly spaced abutment formations fixed on the guide body and engageable with the ring for permitting only limited rotation of the ring on the guide body;
    a tightening spring braced angularly between the ring and the guide body and urging the ring angularly in the forward direction on the guide body;
    a holding sleeve axially displaceable on the chuck body and having an annular row of teeth meshable in a locking position with the teeth of the ring, the teeth of both rows being complementary and sawtooth shaped with steep and shallow flanks, the steep flank of each locking-ring tooth being ahead in the tightening direction of the respective shallow flank;
    a return spring braced between the holding sleeve and the chuck body and urging the holding sleeve axially into the locking position, the holding sleeve being movable against the return spring into a freeing position with the rows of teeth out of mesh with each other;
    means including front and back abutments operatively effective on the chuck body and holding sleeve permitting only limited angular movement of the holding sleeve on the chuck body and defining relative to the forward tightening direction front and back end positions of the holding sleeve on the chuck body; and
    means including a cam surface operatively engageable with the holding sleeve for axially displacing the holding sleeve into the freeing position when engaged with either of the front and back abutments and for displacement of the holding sleeve into the locking position when between the front and back abutments.

2. The self-tightening hammer-drill chuck defined in claim 1 wherein the guide body is formed with a plurality of angularly equispaced pockets open toward the chuck body and each having a pair of end faces.

3. The self-tightening hammer-drill chuck defined in claim 2 wherein the guide body includes a locking ring formed with the pockets.

4. The self-tightening hammer-drill chuck defined in claim 2 wherein the ring is formed with respective projections engaged in the pockets and having front and back end faces respectively engageable with the respective front and back end faces and spaced angularly apart by a distance substantially shorter than an angular spacing between the respective pocket front and back abutments.

5. The self-tightening hammer-drill chuck defined in claim 3 wherein one such tightening spring is provided in each pocket braced between the respective back end faces.

6. The self-tightening hammer-drill chuck defined in claim 1 wherein the chuck body has a follower tab engaging the cam surface and the cam surface is formed on the holding sleeve and includes
- an intermediate abutment a back ramp extending therefrom toward the respective back abutment,
- a level portion extending from the intermediate abutment toward the front abutment and positioned such that, when in operative engagement with the tab, the holding sleeve is in the freeing position, and
- a front ramp extending from the level portion to the front abutment.

7. The self-tightening hammer-drill chuck defined in claim 6 wherein the intermediate abutment defines a shoulder having an axial height shorter than an axial depth of the teeth, whereby when the tab is against the intermediate abutment and its teeth slip over the guide-body teeth, the holding sleeve is moved past the intermediate abutment.

8. The self-tightening hammer-drill chuck defined in claim 6 wherein the front ramp is so steep and the return spring so soft that when substantially only the return spring is urging the holding sleeve into the locking position it will move into the locking position by sliding along the ramp.

9. The self-tightening hammer-drill chuck defined in claim 6 wherein the holding sleeve includes a ring fixed to it and formed with the tab.

10. The self-tightening hammer-drill chuck defined in claim 1, further comprising
- a flat abutment face formed on the chuck body; and
- a tooth having a pair of opposite flanks extending at an obtuse angle to each other on the holding sleeve, the flanks being alternately engageable with the flat abutment face in angular end positions of the holding sleeve on the chuck body.

* * * * *